(12) United States Patent
Matsuoka et al.

(10) Patent No.: US 6,779,626 B2
(45) Date of Patent: Aug. 24, 2004

(54) ELECTRIC POWER STEERING DEVICE

(75) Inventors: Yuki Matsuoka, Nara (JP); Mitsuhiko Nishimoto, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/610,875

(22) Filed: Jul. 2, 2003

(65) Prior Publication Data

US 2004/0003957 A1 Jan. 8, 2004

(30) Foreign Application Priority Data

Jul. 3, 2002 (JP) .................................... P2002-194221

(51) Int. Cl.[7] ................................................ B32D 5/04
(52) U.S. Cl. ......................... 180/446; 701/42; 180/404
(58) Field of Search ................................ 180/443, 446, 180/404; 701/41, 42, 43, 44

(56) References Cited

U.S. PATENT DOCUMENTS 5,667,033 A * 9/1997 Shimizu et al. ............. 180/272
6,131,059 A * 10/2000 Kaji et al. .................... 701/41
6,456,090 B1 * 9/2002 Ishikawa et al. ............ 324/546
2002/0022912 A1 * 2/2002 Urabe et al. .................. 701/41

FOREIGN PATENT DOCUMENTS

JP          2001050830 A  *  2/2001  ............. G01L/3/10

\* cited by examiner

Primary Examiner—Kevin Hurley
(74) Attorney, Agent, or Firm—McGinn & Gibb, PLLC

(57) ABSTRACT

The present invention provides an electric power steering device. The ECU of the device includes a microcomputer; a PWM signal generating circuit for generating a PWM signal according to the command value; a motor drive circuit for impressing a voltage corresponding to the PWM signal upon the motor; an electric current detector for detecting an electric current flowing in the motor; an off-set limit value storage circuit for storing the restricting value showing the allowable range of the middle point voltage; a middle point off-set voltage generation circuit for generating a voltage signal of the predetermined restricting voltage in the range of the restricting value when the actually measured middle point voltage stored in the microcomputer as the middle point voltage is compared with the restricting value; and an amplifier for outputting a signal amplified a difference voltage between the signal sent from the torque sensor and the middle point off-set voltage generation circuit.

4 Claims, 6 Drawing Sheets

ELECTRIC POWER STEERING DEVICE

BACKGROUND OF THE INVENTION

1. Field of the Invention

The present invention relates to an electric power steering device for giving an assisting steering force to a steering mechanism of a vehicle by an electric motor.

2. Description of the Related Art

Conventionally, there is provided an electric power steering device in which an assisting steering force is given to a steering mechanism by driving an electric motor according to a steering torque given to a handle (steering wheel) by a driver. In this electric power steering device, there is provided a torque sensor by which a steering torque given to the steering wheel, which is a steering means, is detected and a torque detection signal indicating the steering torque is outputted. According to the torque detection signal sent from the torque sensor, a target value of the electric current, which is made to flow in the electric motor, is determined. According to the deviation between this target value and the detection value of the electric current actually flowing in the electric motor, a command value to be given to the drive means of the electric motor is generated. The drive means for driving the electric motor includes: a PWM signal generation circuit for generating a pulse width modulation signal (PWM signal) of a duty ration according to the command value; and a motor drive circuit composed of a power transistor turned on and off according to the duty ratio of the PWM signal. Voltage corresponding to the duty ratio, that is, voltage corresponding to the command value is impressed upon the electric motor. An electric current flowing in the electric motor by this impression of voltage is detected by the electric current detector, and a difference between this detection value and the above target value is used as deviation for generating the above command value. As described above, in the electric power steering device, feedback control is conducted so that the target electric current, which is set according to the steering torque indicated by the torque detection signal sent from the torque sensor, can flow in the electric motor.

The torque detection signal outputted from the torque sensor is a voltage signal corresponding to the steering torque. When the steering torque value is "0", the voltage value of the signal concerned is referred to as a middle point voltage. This middle point voltage is shifted from a predetermined reference value due to a difference between the individual torque sensors and also due to deviation of the hardware into which the torque detection signal is inputted. Therefore, when each torque sensor is installed or the initial setting of the apparatus is conducted, either the middle point voltage value peculiar to the torque sensor concerned or the correction value for correcting a deviation from the above reference value is stored in the apparatus. This motion is referred to as "a middle point adjusting motion", hereinafter, and a value stored here is referred to as "a storage value", hereinafter. By the constitution in which the middle point voltage is calculated according to this storage value, the above feedback control is conducted according to the middle point voltage which is not affected by the difference between the individual torque sensors.

As described above, in the electric power steering device, the torque value detected by the torque sensor for setting the target electric current value is an important factor. However, there is a possibility that the storage value obtained as a result of the above middle point adjusting motion becomes abnormal because of the abnormal motion of the storage device after that. In the case where the torque value is calculated according to this abnormal storage value, the electric current target value is set at an abnormal value. As a result, an abnormal assisting steering force is generated, and it causes that a driver's good feeling of steering may be hurt and hazardous driving conditions (such as a slip-and-fall condition) may occur.

SUMMARY OF THE INVENTION

It is an object of the present invention to provide an electric power steering device not hurting a driver's good feeling of steering even when the storage value is abnormal due to an abnormal motion of the storage device.

The first invention provides an electric power steering device for giving an assisting steering force to a steering mechanism of a vehicle by driving an electric motor according to a steering torque given to a steering means for steering the vehicle, comprising:

a torque sensor for outputting a voltage corresponding to the steering torque as a torque detection signal;

a middle point voltage storage means for storing a value corresponding to a middle point voltage which is a voltage outputted from the torque sensor when the steering torque is 0;

a steering torque calculation means for calculating the steering torque according to a torque detection signal, which is outputted from the torque sensor, and a value stored by the middle point voltage storage means;

an electric current detection means for detecting an electric current flowing in the electric motor and outputting a detection value of the electric current;

a motor control means for generating a command value used for feedback control conducted for driving the electric motor according to deviation of the electric current detection value from an electric current target value, which is set as a target value of an electric current to be supplied to the electric motor, according to the steering torque calculated by the steering torque calculation means;

a drive means for driving the electric motor according to the command value; and a suppressing means for suppressing the assisting steering force in the case where the value stored in the middle point voltage storage means is out of a predetermined allowable range.

According to the first invention described above, in the case where the value stored by the middle point voltage storage means is out of a predetermined allowable range, the abnormal assisting steering force is suppressed by the suppressing means. Due to the above constitution, even when a value corresponding to the middle point voltage stored by the middle point voltage storage means is abnormal for the reasons of malfunction or others, an abnormal assisting steering force is suppressed as a result. Therefore, it is possible to prevent a driver's good feeling of steering from being hurt and hazardous driving conditions.

The second invention provides an electric power steering device according to the first invention, wherein when the value stored in the middle point voltage storage means is not out of the allowable range, the suppressing means gives a value stored in the middle point voltage storage means to the steering torque calculation means, and when the value stored in the middle point voltage storage means is out of the allowable range, a predetermined value in the allowable range is given to the steering torque calculation means, and the steering torque calculation means calculates the steering torque using a value given from the suppressing means.

According to the second invention described above, in the case where a value stored by the middle point voltage storage means is out of a predetermined allowable range, a value in the predetermined allowable range is given to the steering torque calculation means by the suppressing means as a value corresponding to the middle point voltage. Due to this constitution, even when a value stored by the middle point voltage storage means is abnormal, there is no possibility that an abnormal assisting steering force is generated. Therefore, it is possible to prevent a driver's good feeling from being hurt and hazardous driving conditions.

The third invention provides an electric power steering device according to the first invention, wherein when the value stored by the middle point voltage storage means is out of the allowable range, the suppressing means stops generating the assisting steering force.

According to the third invention described above, in the case where a value stored by the middle point voltage storage means is out of the predetermined value, generation of the assisting steering force is stopped. Due to this constitution, even when a value corresponding to the middle point voltage stored by the middle point voltage storage means greatly deviates exceeding the allowable range, no assisting steering force is generated as a result. Therefore, it is possible to positively prevent a driver's good feeling of steering from being hurt and hazardous driving conditions.

The fourth invention provides an electric power steering device according to the first invention, the suppressing means including: an auxiliary storage means for storing the same value as the value stored by the middle point voltage storage means; and abnormality processing means for stopping generating the assisting steering force in the case where a difference between the value stored by the middle point voltage storage means and the value stored by the auxiliary storage means is not less than a predetermined value.

According to the fourth invention described above, in the case where a difference between the value stored by the auxiliary storage means and the value stored by the middle point voltage storage means is larger than a predetermined value, generation of the assisting steering force is stopped. Due to this constitution, even when a value corresponding to the middle voltage stored by the middle voltage storage means is abnormal, no assisting steering force is generated as a result. Therefore, it is possible to positively prevent a driver's good feeling of steering from being hurt. In the case of constitution in which a sub-microcomputer, which is provided in ECU as an auxiliary storage means in many cases, is used, the structure of the apparatus can be made simple and the manufacturing cost can be reduced.

Figure 1:
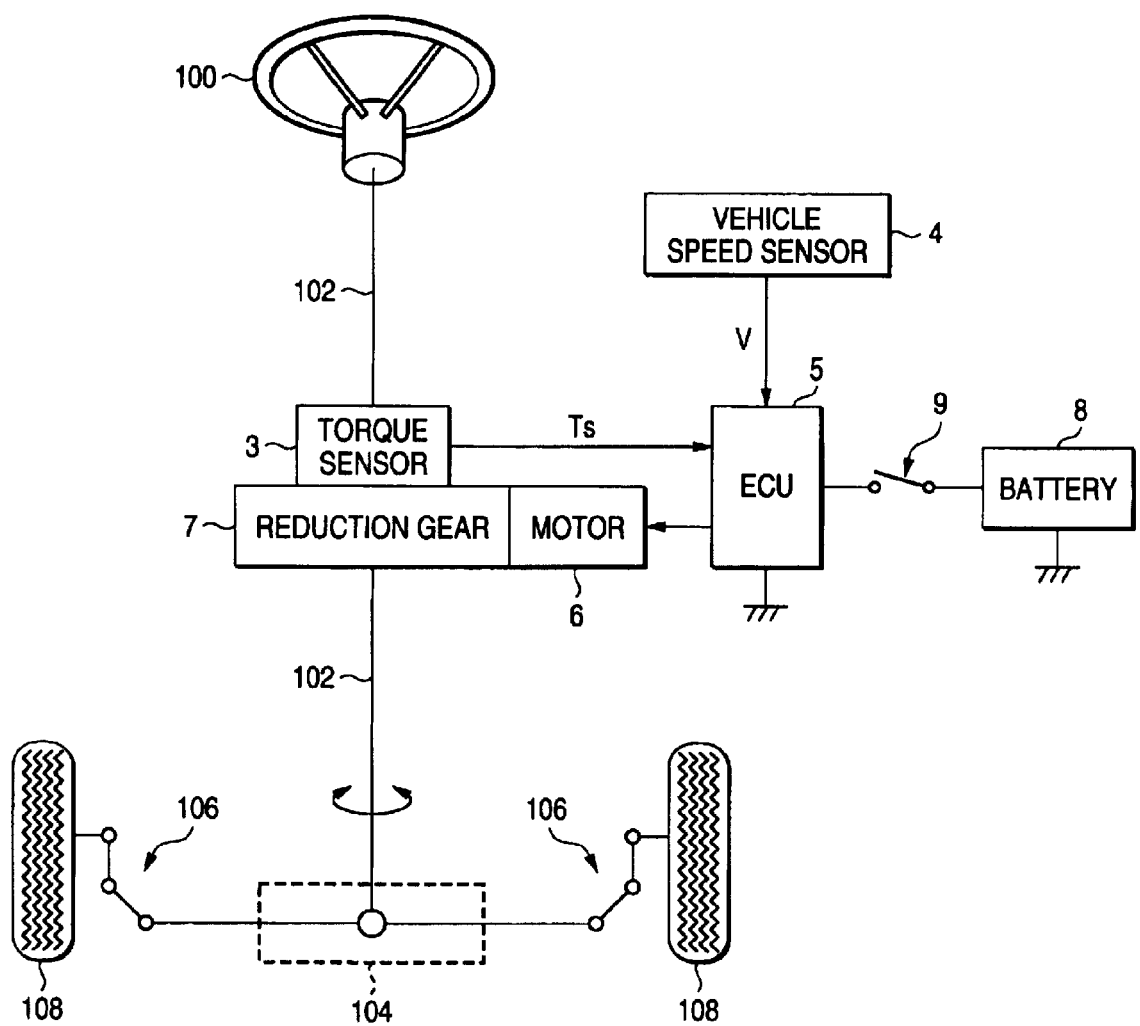
FIG. 1 is a schematic illustration showing the constitution of an electric power steering device of the first embodiment of the present invention together with the constitution of a vehicle.

In the figures, a reference numeral 3 refers to a torque sensor; 4 to a vehicle speed sensor; 5 to an electronic control unit (ECU); 6 to a motor; 7 to a reduction gear; 8 to a battery; 10 to a microcomputer (motor control section); 11 to an amplifier; 12 to a middle point off-set voltage generation circuit; 13 to an off-set limit value storage circuit; 14 to an amplifier; is to a middle point off-set value comparison circuit; 16 to an abnormality processing section; 17 to a middle point offset voltage generation circuit; 18 to a comparison circuit; 20 to a PWM signal generation circuit; 21 to an electric current detector; 22 to a motor drive circuit; and 30 to a sub-microcomputer (auxiliary control section).

Also, a reference sign V refers to a vehicle speed; D to Command value; L to a restricting value; $T_s$ to a steering torque value; $O_v$ to a middle point off-set voltage value; $A_{on}$ to an abnormality judgment signal; $M_{off}$ to a motor stoppage signal; and each of O, $O_a$, and $O_b$ to an actually measured middle point voltage value.

DETAILED DESCRIPTION OF THE PREFERRED EMBODIMENTS

Referring to the accompanying drawings, embodiments of the present invention will be explained as follows <1. First Embodiment>

FIG. 1 is a schematic illustration showing the constitution of an electric power steering device of the first embodiment of the present invention together with the constitution of a vehicle. This electric power steering device includes: a steering shaft 102, one end of which is fixed to the handle (steering wheel) 100 which is a steering means; a rack pinion mechanism 104 connected with the other end of the steering shaft 102; a torque sensor 3 for detecting a steering torque given to the steering shaft 102 by the operation of the steering wheel 100; a vehicle speed sensor 4 for detecting a speed of a vehicle on which this electric power steering device is mounted; an electric motor 6 for generating an assisting steering force so as to reduce a load given to a driver when the steering wheel is operated; a reduction gear 7 for transmitting an assisting. steering force generated by the motor 6 to the steering shaft 102; and an electronic control unit (ECU) 5 for controlling the drive of the motor 6 according to the sensor signals sent from the torque sensor 3 and the vehicle speed sensor 4, wherein electric power is supplied to the electronic control unit (ECU) 5 from the battery 8 mounted on the vehicle via the ignition switch 9.

In this steering shaft 102, between a portion on the steering wheel side and a portion to which the assisting steering torque $T_a$ is given via the reduction gear 7, there is provided a torsion bar. The torque sensor 3 detects a steering torque by detecting torsion of the torsion bar. The detected value $T_s$ of the steering torque detected in this way is outputted from the torque sensor 3 as a steering torque detection signal and inputted into ECU 5. The vehicle speed sensor 4 outputs a signal indicating the vehicle speed as a vehicle speed signal. This vehicle speed signal is also inputted into ECU 5.

When a driver operates the steering wheel 100 in a vehicle on which the above electric power steering device is mounted, the steering torque given by the steering operation is detected by the torque sensor 3, and the electric motor 6 is driven by ECU 5 according to the steering torque $T_s$, which is detected by the steering torque sensor 3, and the vehicle speed V (referred to as "vehicle speed V" hereinafter) which is detected by the vehicle speed sensor 4. Due to the foregoing, the motor 6 generates an assisting steering force. When this assisting steering force is given to the steering shaft 102 via the reduction gear 7, a steering load given to the driver can be reduced. That is, a sum of the steering torque, which is given by the steering operation, and the torque $T_a$, which is generated by the assisting steering force generated by the motor 6, is given to the rack pinion mechanism 104 via the steering shaft 102 as the output torque $T_b$. When the pinion shaft is rotated by this output torque $T_b$, the rotation is converted into a reciprocating motion of the rack shaft by the rack pinion mechanism 104. Both end portions of the rack shaft are connected with the wheels 108 via the connecting members 106 composed of the tie rods and knuckle arms. Therefore, according to the reciprocating motion of the rack shaft, the directions of the wheels 108 can be changed.

Figure 2:
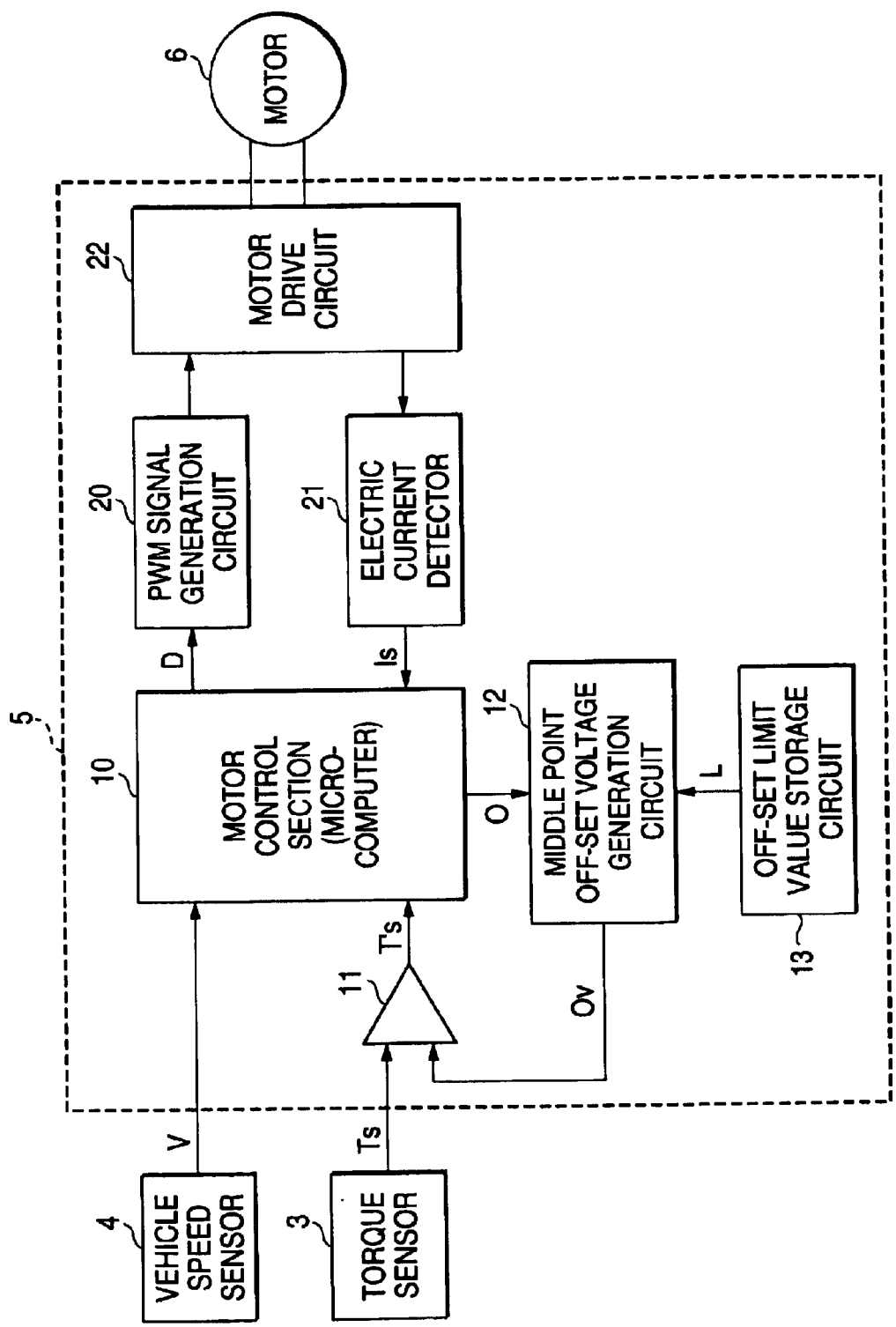
FIG. 2 is a block diagram showing a functional constitution of ECU which is a control unit of the electric power steering device of the above embodiment.

FIG. 2 is a block diagram showing a functional constitution of ECU 5 which is a control unit of the above electric power steering device. This ECU 5 includes: a microcomputer 10 (referred to as "a micon" hereinafter) which functions as a motor controlling section; a PWM signal generating circuit 20 for generating a pulse width modulation signal (PWM signal) of the duty ratio according to the command value D outputted from the microcomputer 10; a motor drive circuit 22 for impressing the voltage corresponding to the duty ratio of the PWM signal upon the motor 6; an electric current detector 21 for detecting an electric current flowing in the motor 6; an off-set limit value storage circuit 13 for outputting the restricting value L previously stored; a middle point off-set voltage generation circuit 12 for generating a voltage signal of the predetermined restricting voltage $O_v$ according to the actually measured middle point voltage O outputted from the microcomputer 10 as a value corresponding to the middle point voltage and also according to the predetermined restricting value L outputted from the off-set limit value storage circuit 13; and an amplifier 11 for outputting a signal showing the amplified torque detection value $T'_s$ in which a difference voltage of the voltage signal between the signal showing the steering torque detection value $T_s$ sent from the torque sensor 3 and the restricting voltage $O_v$ sent from the middle point off-set voltage generation circuit 12 is amplified.

When the microcomputer 10 executes a predetermined program stored in the internal memory, the microcomputer 10 decides the target value $I_t$ of the electric current, which is made to flow in the motor 6, according to the amplified torque detection value $T'_s$, which is given by the torque sensor 3 via the amplifier 11, and the vehicle speed V which is sent from the vehicle speed sensor 4. Next, the deviation $I_t - I_s$ between the target value $I_t$ of the electric current and the detection value $I_s$ of the electric current of the motor outputted from the electric current detector 21 is calculated. Further, by the proportional integration controlling calculation according to the deviation $I_t - I_s$, the aforementioned command value D for feedback control to be given to the PWM signal generation circuit 20 is generated.

The PWM signal generating circuit 20 generates a pulse signal of the duty ratio corresponding to this command value D, that is, the PWM signal generating circuit 20 generates a PWM signal, the pulse width of which changes according to the command value D. The motor drive circuit 22 is a bridge circuit composed of four field effect transistors for electric power use which are connected between the electric power source line of the battery 8 and the ground line. The motor drive circuit 22 impresses a voltage corresponding to the pulse width (duty ratio) of the PWM signal upon the motor 6. The motor 6 generates a torque, the intensity and direction of which correspond to the electric current flowing when the voltage is impressed.

The microcomputer 10 outputs the actually measured middle point voltage value O stored in the internal memory (non-volatile memory). This actually measured middle point voltage value O is a permanent value obtained when a voltage value, which is outputted from the torque sensor 3 while the torque given to the torsion bar is set at "0" when the torque sensor 3 is installed or the electric power supply is first turned on (at the initial setting), is written in the memory. This writing motion is referred to as a middle point adjusting motion. The above middle point adjusting motion, which is previously conducted before the normal motion of the apparatus, will be described in detail referring to FIG. 3.

Figure 3:
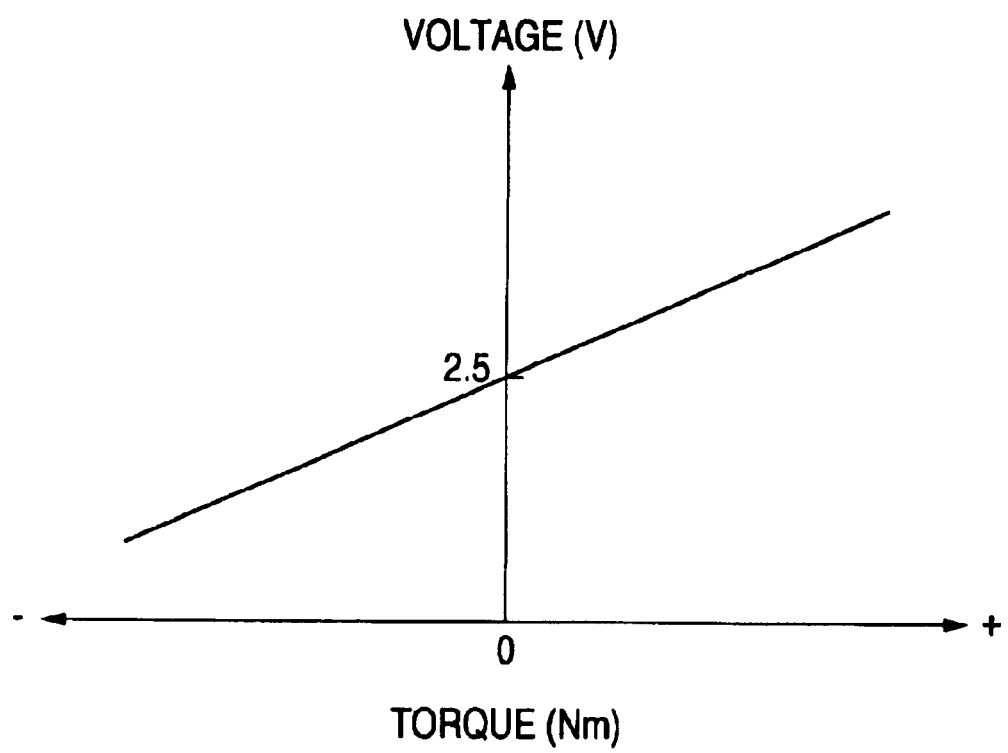
FIG. 3 is a graph showing a relation between the voltage indicated by the steering torque detection signal and the torque to be given in the above embodiment.

The steering torque detection signal outputted from the torque sensor 3 is a voltage signal. The voltage value changes as shown in FIG. 3 according to the torque given to the torque sensor 3. FIG. 3 is a graph showing a relation between the voltage indicated by the steering torque detection signal and the above torque. On the graph, the axis of ordinate shows the voltage (V), and the axis of abscissa shows the torque ($N_m$). When no force is given to the steering wheel by a driver, the torque value is "0", and when the steering wheel is rotated to the right or left by the driver, the torque value is changed to a positive or negative value according to the direction in which the steering wheel is rotated. The voltage outputted from the torque sensor 3 when the torque value is "0" is referred to as a middle point voltage. In this case, the middle point voltage is 2.5 V. In this connection, due to the difference between the individual torque sensors, this middle point voltage is shifted from a predetermined reference value (for example, 2.5 V), which is the original middle point voltage, by a predetermined range (for example, by a range of ±0.1 V) In order to solve the above problems caused by the difference between the individual bodies, an adjusting motion for correcting a shift from the reference value of the middle point voltage in the case of initial setting is conducted, that is, a middle point adjusting motion for setting a value corresponding to the middle point voltage used in the case of normal operation is conducted. Although the actually measured middle point voltage O is shifted from the above reference value by a predetermined range, when this actually measured middle point voltage O is used as a value corresponding to the middle point voltage which is corrected (offset) from the reference value, it is possible to solve the above problems of the shift caused by the difference between the individual bodies. In this connection, the microcomputer 10 may be composed in such a manner that instead of the actually measured middle point voltage O, a difference between the above reference value and the actually measured middle point voltage O is stored as a correction value, and the correction value is added to the previously stored reference value so as to output the actually measured middle point voltage O.

By the above middle point adjusting motion previously conducted as described above, the actually measured middle point voltage O, which is stored in the microcomputer 10, is inputted into the middle point off-set voltage generation circuit 12 in the case of normal operation. The off-set limit value storage circuit 13 previously stores the restricting value L which is determined as a value showing an allowable range of the middle point voltage. This restricting value L is inputted into the middle point off-set voltage generation circuit 12. The restricting value L is a value out of the range of the middle point voltage and includes the upper limit (the maximum value in the allowable range), which corresponds to the middle point voltage in the case where a shift from the above reference value is in an allowable range, and also includes a lower limit (the minimum value in the allowable range). In this case, a shift in the allowable range is defined as a shift by which an abnormal motion of the apparatus or a bad motion (for example, a motion by which a steering feeling is damaged) is not caused. The reason why the restricting value L is determined as described above is to prevent the occurrence of the following case in which a driver's good steering feeling is hurt. In the case where the actually measured middle point voltage O is an abnormal value, the target value of the electric current is set at an abnormal value. As a result, when an abnormal assisting steering force is generated, a driver's good steering feeling is hurt. In this connection, the shift in the allowable range may be a shift which may be caused in the normal operation of the apparatus.

The middle point off-set voltage generation circuit 12 compares the actually measured middle point voltage sent from the microcomputer 10 with the restricting value L including the upper limit and the lower limit sent from the off-set limit value storage circuit 13, and according to the result of the comparison, a voltage signal of the restricting voltage $O_v$ which is set as follows is outputted. In the case where the above actually measured middle point voltage O exceeds the upper limit included in the restricting value L or is lower than the lower limit, the restricting voltage $O_v$ is set at a predetermined value in the range from the upper limit to the lower limit. In the case where the above actually measured middle point voltage O is in a range from the upper limit to the lower limit included in the restricting value L, the restricting voltage $O_v$ is set at the actually measured middle point voltage O. Accordingly, even in the case where the actually measured middle point voltage O is an abnormal value, the restricting voltage $O_v$ is not out of the range (from the upper limit to the lower limit) shown by the restricting value L. For example, in the case where a predetermined reference value, which must be the middle point voltage, is 2.5 V and the actually measured middle point voltage O, which is set as a value corresponding to the actual middle point voltage in the case of initial setting, is 2.6 V, if the upper limit previously included in the restricting value L is 2.65 (V) and the lower limit is 2.45 (V), even when the actually measured middle point voltage O becomes an abnormal value after the initial setting, the restricting voltage $O_v$ becomes a value in the range from 2.45 (V) to 2.65 (V). In this connection, in the case where the above actually measured middle point voltage O exceeds the upper limit or is lower than the lower limit, the restricting voltage $O_v$ may be set at the reference value or the actually measured middle point voltage in the case of normal operation which is temporarily stored at a predetermined point of time.

A voltage signal of the restricting voltage $O_v$ is inputted into one of the two input terminals of the amplifier 11. A signal showing the steering torque $T_s$ is inputted into the other input terminal of the amplifier 11. The amplifier 11 amplifies a difference voltage between these input signals and outputs the amplified torque detection value $T'_s$ in which the voltage is adjusted to be the reference value when the steering torque is "0". This signal is given to the microcomputer 10. According to this signal voltage, the microcomputer 10 calculates a steering torque for the above feedback control. As described above, in the present embodiment, the calculation of the steering torque according to the middle point voltage is conducted by a predetermined program executed by the amplifier 11 and the microcomputer 10. Therefore, the microcomputer 10 and the amplifier 11 function as a steering torque calculation means.

According to the above embodiment, the restricting value L stored in the off-set limit value storage circuit 13 determines the upper limit and the lower limit of the allowable range, and the voltage signal corresponding to the middle point voltage to be given to the amplifier 11 is outputted from the middle point off-set voltage generation circuit 12. Due to the above constitution, the voltage corresponding to the middle point voltage does not become a value greatly different from the reference voltage so that the value can not be allowed. Therefore, even when a value (actually measured middle point voltage O) corresponding to the middle point voltage stored in the microcomputer 10 becomes an abnormal value for some reasons such as a malfunction of the microcomputer 10, there is no possibility that an abnormal assisting steering force is generated. Therefore, it is possible to prevent a driver's good steering feeling from being hurt. In this connection, the restricting value L is set in an appropriate adjustment range while consideration is given to a difference between the individual bodies of the apparatus.

<2. Second Embodiment>

The constitution of the electric power steering device of the second embodiment of the present invention is substantially the same as the constitution of the electric power steering device of the first embodiment described above, however, one portion of ECU 5, which is a control unit of the electric power steering device of the second embodiment, is different. Accordingly, the explanations of the same constitution and operation as those of the electric power steering device of the first embodiment will be omitted here, and the constitution and operation different from those of the electric power steering device of the first embodiment will be mainly explained here.

Figure 4:
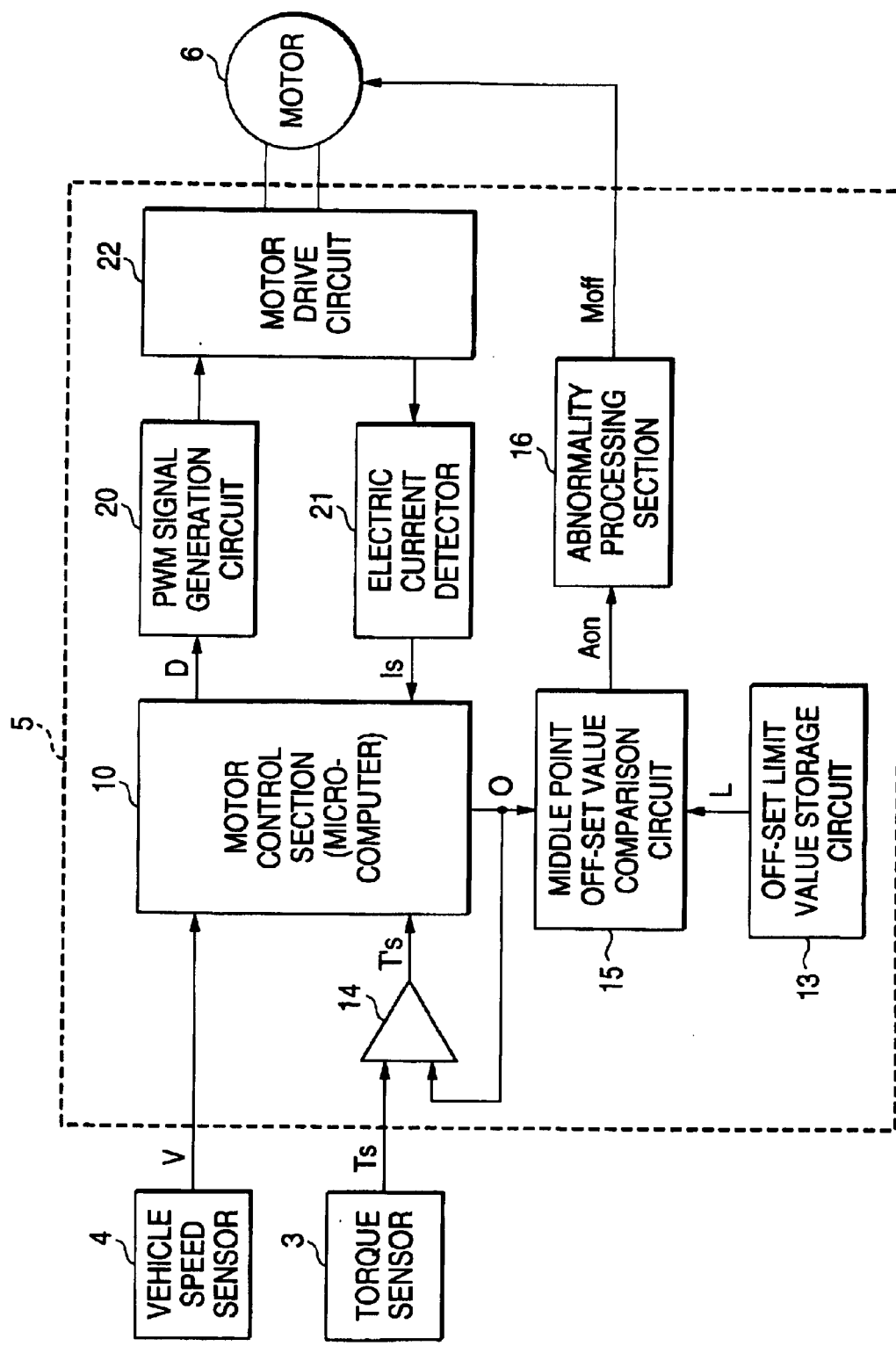
FIG. 4 is a block diagram showing the constitution of ECU which is a control unit of the electric power steering device of the second embodiment of the present invention.

FIG. 4 is a block diagram showing the constitution of ECU 5 which is a control unit of the electric power steering device of this embodiment. This ECU 5 include: a microcomputer 10 which has the substantially same constitution as that of the first embodiment; a PWM signal generation circuit 20; a motor drive circuit 22; an electric current detector 21; and an off-set limit value storage circuit 13. Instead of the middle point off-set voltage generation circuit 12 shown in FIG. 2, ECU 5 of this embodiment includes a restriction value comparison circuit 15. Instead of the amplifier 11, ECU 5 of this embodiment includes an amplifier 14 for amplifying a signal showing the steering torque detection value $T_s$ and outputting the amplified signal as a signal showing the amplified torque detection value $T'_s$. ECU 5 of this embodiment further includes an abnormality processing section 16 for stopping the motor 6 in a predetermined case.

In this case, operation of the microcomputer 10, PWM signal generation circuit 20, motor drive circuit 22 and electric current detector 21 is the same as that of the first embodiment. Therefore, the explanations will be omitted here. According to the actually measured middle point voltage O corresponding to the middle point voltage of the detection value $T_s$ of the steering torque stored in the internal memory of the microcomputer 10, the microcomputer 10 calculates a voltage value corresponding to the middle point voltage of the amplified torque detection value $T'_s$ at which the amplified torque detection value $T'_s$ becomes 0 in the case where the steering torque is "0". Then, the microcomputer 10 calculates a steering torque according to this voltage value. As described above, in this embodiment, the calculation of the steering torque according to the middle point voltage is conducted by a predetermined program executed by the microcomputer 10. Therefore, the function of the steering torque calculation means can be realized by the microcomputer 10.

Operation of the off-set limit value storage circuit 13 is substantially the same as that of the first embodiment. The restricting value L is determined by the upper limit and the lower limit of the value corresponding to the middle point voltage in the case where a shift from the reference value is in the allowable range. In this case, the shift from the reference value in the allowable range is defined as a shift by which the apparatus is not abnormally operated. Alternatively, the shift from the reference value in the allowable range is defined as a shift by which a driver's feeling is not hurt even when the giving of the assisting steering force is not stopped. The reason why the restricting value L is determined as described above is that when a value corresponding to the middle point voltage is greatly different from the reference voltage so that it can not be allowed, the generation of an abnormal assisting steering force is prevented. In this connection, the shift in the allowable range may be a shift which may be caused in the usual operation of the apparatus, which is the same as the case of the first embodiment.

In the same manner as that of the middle point off-set voltage generation circuit 12 shown in FIG. 2, the middle point off-set value comparison circuit 15 compares the actually measured middle point voltage O, which is sent from the microcomputer 10, with the restricting value L which is sent from the off-set limit value storage circuit 13. However, the middle point off-set value comparison circuit 15 does not output a voltage signal of the restricting voltage $O_v$, but outputs the abnormal judgment signal $A_{on}$ according to the result of the comparison in the following case. This abnormality judgment signal $A_{on}$ is outputted in the case where the actually measured middle point voltage O exceeds the upper limit included in the restricting value L or in the case where the actually measured middle point voltage O is lower than the lower limit. In the case where the actually measured middle point voltage O is in the range from the upper limit to the lower limit included in the restricting value L, the abnormality judgment signal $A_{on}$ is not outputted. This abnormality judgment signal $A_{on}$ is inputted into the abnormality processing section 16.

In the case where this abnormality judgment signal $A_{on}$ is inputted, the abnormality processing section 16 makes an output device not shown, which is provided in the driving chamber of a vehicle, output a warning. For example, the abnormality processing section 16 makes the output device output one or all of the following motions. The motions are a motion of displaying a warning sentence on the liquid crystal display device which is the output device, a motion of lighting a warning lamp, and a motion of outputting a sound or voice of warning from a speaker. At the same time, the abnormality processing section 16 outputs the motor stop signal $M_{off}$ which is a signal of operating a relay not shown provided while it is accompanying the motor 6. When a signal is inputted into this relay, the electric power supply line of the motor 6 is opened. Therefore, when the above motor stop signal $M_{off}$ is inputted into this relay, the motor 6 is stopped and the assisting steering force becomes 0.

According to the above embodiment, when the actually measured middle point voltage O is out of the allowable range indicated by the restricting value L, the abnormality judgment signal $A_{on}$ is outputted from the middle point off-set value comparison circuit 15, and the motor 6 is stopped by the abnormality processing section 16. Due to the above constitution, even when the value (the actually measured middle point voltage O) corresponding to the middle point voltage stored in the microcomputer 10 becomes an abnormal value for some reasons such as a malfunction of the microcomputer 10 and others, that is, even when the value corresponding to the middle point voltage is greatly shifted from the reference voltage so that the shifted value can not be allowed, no assisting steering force is generated as a result. Therefore, it possible to positively prevent a driver's good feeling from being hurt.

<3. Third Embodiment>

The constitution of the electric power steering device of the third embodiment of the present invention is substantially the same as the constitution of the electric power steering device of the first embodiment described above, however, one portion of ECU 5, which is a control unit of the electric power steering device of the third embodiment, is different. Accordingly, the explanations of the same constitution and operation as those of the electric power steering device of the first embodiment will be omitted here, and the constitution and operation different from those of the electric power steering device of the first embodiment will be mainly explained here.

Figure 5:
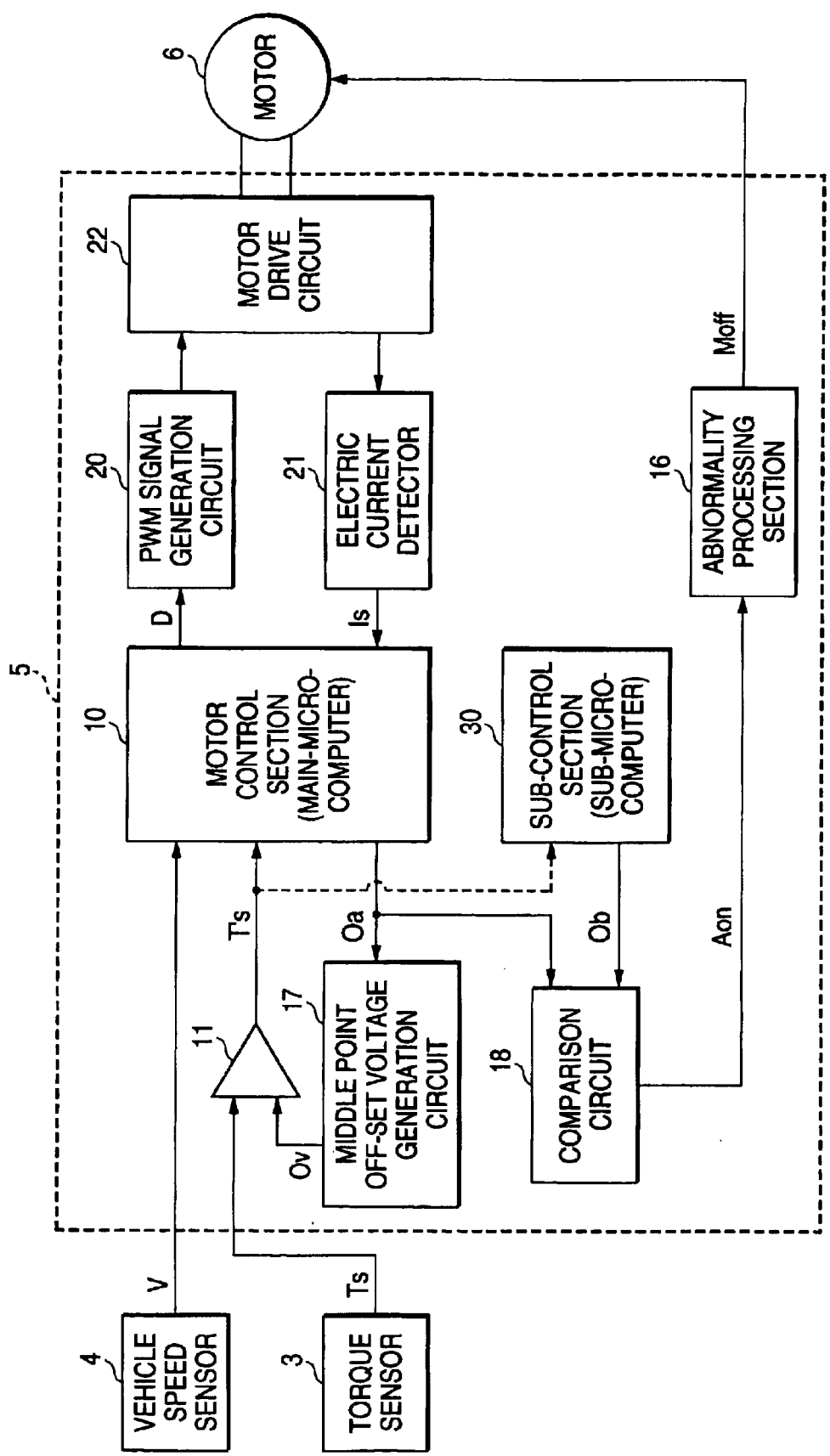
FIG. 5 is a block diagram showing the constitution of ECU which is a control unit of the electric power steering device of the third embodiment of the present invention.

FIG. 5 is a block diagram showing the constitution of ECU 5 which is a control unit of the electric power steering device of the this embodiment. This ECU 5 include: a main microcomputer 10 which has the substantially same constitution as that of the first embodiment; a PWM signal generation circuit 20; a motor drive circuit 22; an electric current detector 21; and an amplifier 11. Instead of the middle point off-set voltage generation circuit 12 shown in FIG. 2, ECU 5 of this embodiment includes a middle point off-set voltage generation circuit 17 and a comparison circuit 18. Instead of the off-set limit value storage circuit 13 shown in FIG. 2, ECU 5 of this embodiment includes a sub-microcomputer 30 functioning as an auxiliary control section for controlling each device. ECU 5 of this embodiment further includes an abnormality processing section 16 which is the same as that of the second embodiment.

In this case, operation of the main microcomputer 10, PWM signal generation circuit 20, motor drive circuit 22 and electric current detector 21 is the same as that of the first embodiment. Therefore, the explanations will be omitted here. This main microcomputer 10 outputs the first actually measured middle point voltage $O_a$ which is the same value as the actually measured middle point voltage O. In the same manner as that of the main microcomputer 10, the sub-microcomputer 30 outputs the second actually measured middle point voltage $O_b$ stored in the internal memory which is a value to be set by the middle point adjusting motion in the process of initial setting. Therefore, usually, the first actually measured middle point voltage $O_a$ and the second actually measured middle point voltage $O_b$ become equal to each other. The second actually measured middle point voltage $O_b$ may be composed in such a manner that the first actually measured middle point voltage $O_a$ is inputted from the main microcomputer 10 into the sub-microcomputer 30 at a predetermined point of time and this value is stored as the second actually measured middle point voltage $O_b$.

Without conducting the comparison motion of the middle point off-set voltage generation circuit 12 shown in FIG. 2, the middle point off-set voltage generation circuit 17 outputs a voltage signal of the voltage $O_v$, the value of which is the same as the first actually measured middle point voltage $O_a$ inputted from the main microcomputer 10 The comparison circuit 18 compares the first actually measured middle point voltage $O_a$ sent from the main microcomputer 10 with the second actually measured middle point voltage $O_b$ sent from the sub-microcomputer 30. The comparison circuit 18 judges whether or not the difference between these values is larger than a predetermined value. In the case where the difference between these values is larger than a predetermined value, it is judged that the first actually measured voltage $O_a$ stored in the main microcomputer 10 is abnormal, and the comparison circuit 18 outputs the abnormality judgment signal $A_{on}$. This abnormality judgment signal $A_{on}$ is inputted into the abnormality processing section 16. The constitution and operation of the abnormality processing section 16 are the same as those of the second embodiment. Therefore, the explanations are omitted here. In this connection, the aforementioned predetermined value is a low value such as a bit error in the case of A/D conversion or a detection error of the torque sensor 3.

According to the above embodiment, when a difference between the first actually measured voltage $O_a$ sent from the main microcomputer 10 and the second actually measured voltage $O_b$ sent from the sub-microcomputer 30 is separate from the predetermined value, the abnormality judgment signal $A_{on}$ is outputted from the comparison circuit 18, and the motor 6 is stopped by the abnormality processing section 16. Due to the above constitution, even when the value (the first actually measured middle point voltage $O_a$) corresponding to the middle point voltage stored in the microcomputer 10 becomes a value different from the initial setting value for some reasons such as a malfunction of the microcomputer 10 and others, no assisting steering force is generated as a result. Therefore, it possible to positively prevent a driver's good feeling from being hurt. Since the sub-microcomputer, which is provided in ECU in many cases, is used in this constitution, the structure can be made simple and the manufacturing cost can be reduced.

In the first to the third embodiment described above, the actually measured middle point voltage stored in the microcomputer 10 is set in the operation of adjusting the middle point, however, the actually measured middle point voltage may be renewed at a predetermined renewal time. In this case, it is preferable to conduct processing in which an abnormal value is prevented from being written in the process of renewal, for example, it is preferable to make a comparison with the value before the renewal. This actually measured middle point voltage may be stored in the storage section different from the microcomputer 10. Further, instead of this actually measured middle point voltage, a correction value, which is a difference between the reference value and the actually measured middle point voltage, may be stored. In this case, the reference value is also stored, and a value corresponding to the actually measured middle point voltage is calculated from the stored reference value and correction value.

According to the constitution of the first to the third embodiment described above, the hardware of the PWM signal generation circuit 20, the middle point off-set voltage generation circuit 12, the middle point off-set value comparison circuit 15 or the middle point off-set voltage generation circuit 17 is different from the hardware of the microcomputer 10. However, it is possible to adopt such a constitution that the function of each component can be realized by software when a predetermined program is executed by the microcomputer 10. In the constitution of the first to the third embodiment described above, the middle point voltage is referred by the amplifier 11 and a signal, which shows the amplifying torque detection value $T'_s$ at which the voltage becomes the reference value when the steering torque is "0", is outputted. However, it is possible to adopt such a constitution that when a predetermined program is executed by the microcomputer 10 instead of the amplifier 11, the middle point voltage is referred by software and the steering torque is calculated. On the contrary, in the constitution of the second embodiment, the calculation of the steering torque according to the middle point voltage is conducted by a predetermined program executed by the microcomputer 10. However, it is possible to adopt such a constitution that the calculation of the steering torque is conducted by the hardware in which the middle point voltage is referred by the amplifier.

In the constitution of the second and the third embodiment, the abnormality processing section 16 stops the motor 6 by operating a relay provided in the motor 6. However, as long as the assisting steering force is made to be 0, it is possible to adopt such a constitution that the operation of the motor drive circuit 22 or the PWM signal generation circuit 20 is stopped. It is also possible to adopt such a constitution that the motor drive circuit 22 or the PWM signal generation circuit 20 is controlled so that the motor 6 can be stopped by the motor drive circuit 22 or the PWM signal generation circuit 20. It is also possible to adopt such a constitution that a clutch device is provided in the middle of the route by which the assisting steering force is transmitted from the motor 6 to the steering shaft 102 via the reduction gear 7 and the transmission of the assisting steering force is cut off by the device concerned. Further, it is also possible to adopt such a constitution of the abnormality processing section 16 that an intensity of the assisting steering force is reduced so that a driver's feeling of steering can not be hurt.

Figure 6:
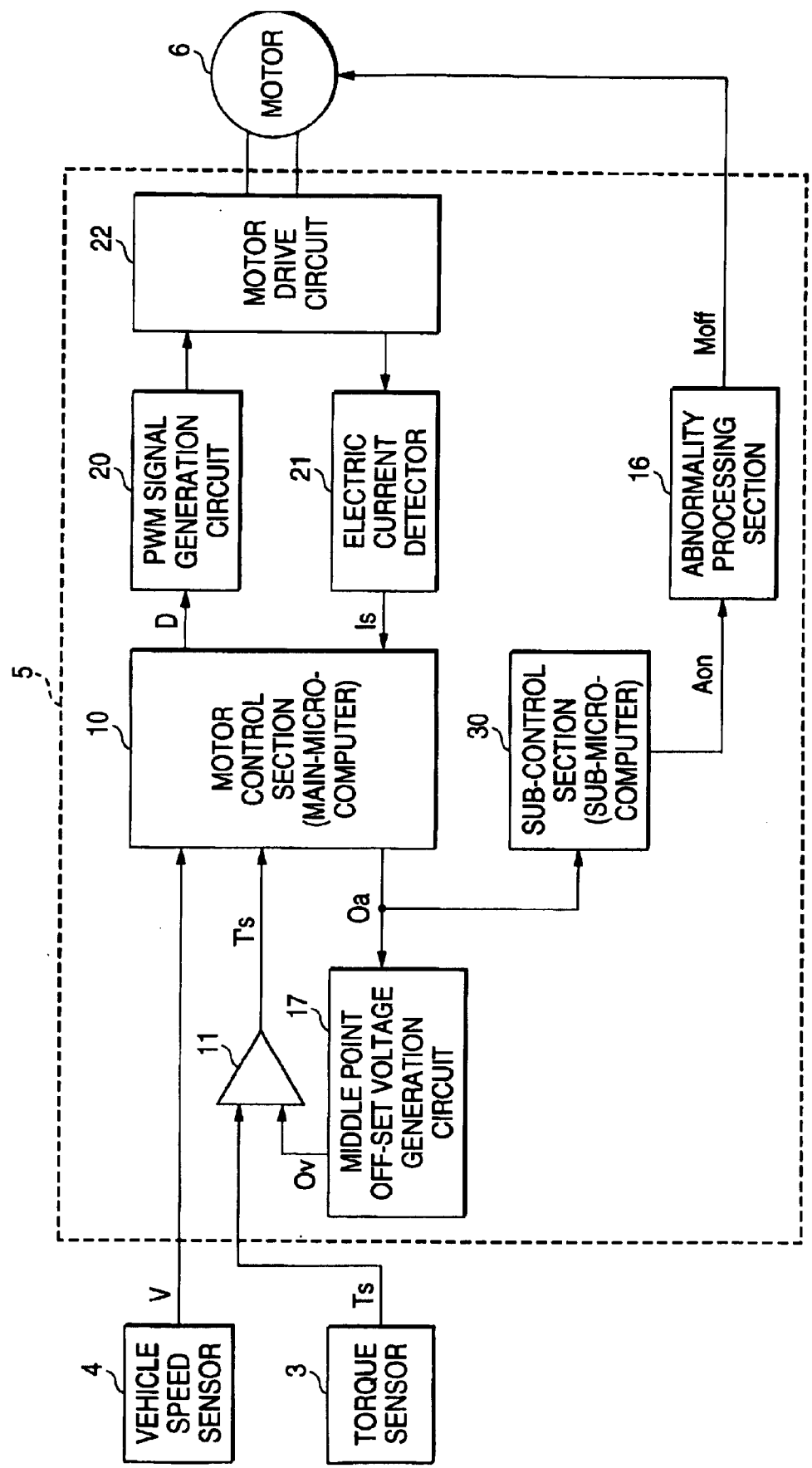
FIG. 6 is a block diagram showing the constitution of ECU which is a control unit of the electric power steering device of the variation of the second embodiment of the present invention.

In the first and the second embodiment, it is possible to adopt such a constitution that the sub-microcomputer 30 described in the third embodiment is newly provided instead of the off-set limit value storage circuit 13 and the function of the off-set limit value storage circuit 13 is realized by this sub-microcomputer 30. Further, it is possible to adopt such a constitution that the function of the middle point off-set voltage generation circuit 12 or the middle point off-set value comparison circuit 15 is realized by this sub-microcomputer 30. Typically, it is possible to consider the constitution is shown in FIG. 6 is a block diagram showing a constitution of ECU in the electric power steering unit of the variation of the second embodiment. In the constitution shown in FIG. 6, instead of the amplifier 14 shown in FIG. 4, the same amplifier 11 as that shown in FIG. 5 and the middle point off-set voltage generation circuit 17 are provided. In the constitution shown in FIG. 6, instead of the off-set limit value storage circuit 13 and the middle point off-set value comparison circuit 15 shown in FIG. 4, the sub-microcomputer 30 is provided. By the memory exclusively used for reading out which is built in this sub-microcomputer 30, the function corresponding to the off-set limit value storage circuit 13 can be realized. By this sub-microcomputer 30, the function corresponding to the middle point off-set value comparison circuit 15 can be realized by software. It is also possible to adopt such a constitution that the comparison circuit 18 is omitted in the third embodiment described above and the function of the comparison circuit 18 is realized by the sub-microcomputer 30. It is also possible to adopt such a constitution that the function of the abnormality processing section 16 in the second and the third embodiment is realized by the sub-microcomputer 30 in the same manner.

In the third embodiment, the sub-microcomputer 30 may not store the second actually measured middle point voltage $O_b$ and the first actually measured middle point voltage $O_a$ sent from the main microcomputer 10 may be inputted and it may be judged whether or not it is in the allowable range. In the case where it is out of the allowable range, the abnormality judgment signal $A_{on}$ is outputted to the abnormality processing section 16.

What is claimed is:

1. An electric power steering device for giving an assisting steering force to a steering mechanism of a vehicle by driving an electric motor according to a steering torque given to a steering means for steering the vehicle, said device comprising:

a torque sensor for outputting a voltage corresponding to the steering torque as a torque detection signal;

middle point voltage storage means for storing a value corresponding to a middle point voltage which is a voltage outputted from the torque sensor when the steering torque is 0;

steering torque calculation means for calculating the steering torque according to a torque detection signal, which is outputted from the torque sensor, and a value stored by the middle point voltage storage means;

electric current detection means for detecting an electric current flowing in the electric motor and outputting a detection value of the electric current;

motor control means for generating a command value used for feedback control conducted for driving the electric motor according to deviation of the electric current detection value from an electric current target value, which is set as a target value of an electric current to be supplied to the electric motor, according to the steering torque calculated by the steering torque calculation means;

drive means for driving the electric motor according to the command value; and suppressing means for suppressing the assisting steering force in the case where the value stored in the middle point voltage storage means is out of a predetermined allowable range.

2. The electric power steering device according to claim 1, wherein when the value stored in the middle point voltage storage means is not out of the allowable range, the suppressing means gives a value stored in the middle point voltage storage means to the steering torque calculation means, and when the value stored in the middle point voltage storage means is out of the allowable range, a predetermined value in the allowable range is given to the steering torque calculation means, and wherein the steering torque calculation means calculates the steering torque using a value given from the suppressing means.

3. The electric power steering device according to claim 1, wherein when the value stored by the middle point voltage storage means is out of the allowable range, the suppressing means stops generating the assisting steering force.

4. The electric power steering device according to claim 1, wherein the suppressing means includes: an auxiliary storage means for storing the same value as the value stored by the middle point voltage storage means; and abnormality processing means for stopping generating the assisting steering force in the case where a difference between the value stored by the middle point voltage storage means and the value stored by the auxiliary storage means is not less than a predetermined value.

* * * * *